(12) United States Patent
Matsumoto et al.

(10) Patent No.: US 12,729,718 B2
(45) Date of Patent: Sep. 8, 2026

(54) ROLLING BEARING

(71) Applicant: MINEBEA MITSUMI Inc., Nagano (JP)

(72) Inventors: Kunihiro Matsumoto, Kitasaku-gun (JP); Ryutaro Hirano, Kitasaku-gun (JP); Kazuki Watanabe, Kitasaku-gun (JP)

(73) Assignee: MINEBEA MITSUMI INC., Nagano (JP)

(*) Notice: Subject to any disclaimer, the term of this patent is extended or adjusted under 35 U.S.C. 154(b) by 33 days.

(21) Appl. No.: 18/731,530

(22) Filed: Jun. 3, 2024

(65) Prior Publication Data

US 2024/0318691 A1 Sep. 26, 2024

Related U.S. Application Data

(63) Continuation of application No. PCT/JP2021/045112, filed on Dec. 8, 2021.

(51) Int. Cl.
*F16C 33/66* (2006.01)
*F16C 33/58* (2006.01)

(52) U.S. Cl.
CPC ........ *F16C 33/6629* (2013.01); *F16C 33/585* (2013.01)

(58) Field of Classification Search
CPC ...... F16C 33/58; F16C 33/583; F16C 33/585; F16C 33/66; F16C 33/6607; F16C 33/6614; F16C 33/6629
See application file for complete search history.

(56) References Cited

U.S. PATENT DOCUMENTS 3,161,448 A * 12/1964 Moran ................ F16C 33/6614 384/462
8,523,449 B2 * 9/2013 Hamada .............. F16C 33/6618 384/477

(Continued)

FOREIGN PATENT DOCUMENTS

CN 102705360 A 10/2012
DE 102015201101 A1 7/2016

(Continued)

OTHER PUBLICATIONS

International Search Report for corresponding International Application No. PCT/JP2021/045112 mailed Mar. 1, 2022.

(Continued)

*Primary Examiner* — James Pilkington
(74) *Attorney, Agent, or Firm* — Chrisman Gallo Tochtrop LLC

(57) ABSTRACT

A rolling bearing includes an outer ring and an inner ring, a rolling element disposed in a rollable manner between the outer ring and the inner ring, a cage holding the rolling element, and a shield. The outer ring includes a raceway surface supporting the rolling element in a rollable manner, recess parts formed at both direction sides in an axial direction with respect to the raceway surface, and a ridge part formed between the recess part and the raceway surface. The recess part includes a placement surface for placing a grease, and a first inclined part formed between the placement surface and the ridge part and approaching an outer peripheral surface of the outer ring toward an outer side in the axial direction.

17 Claims, 8 Drawing Sheets

(56) References Cited

U.S. PATENT DOCUMENTS

| | | | | |
|---|---|---|---|---|
| 9,611,891 | B2 * | 4/2017 | Ishii | F16C 33/7856 |
| 10,648,508 | B2 | 5/2020 | Sugita | |
| 2019/0249717 | A1 | 8/2019 | Sugita | |

FOREIGN PATENT DOCUMENTS

| | | | | |
|---|---|---|---|---|
| EP | 2 743 527 | B1 | 6/2019 | |
| JP | H11-2248 | A | 1/1999 | |
| JP | 2002-174253 | A | 6/2002 | |
| JP | 2005-155877 | A | 6/2005 | |
| JP | 2012-107674 | A | 6/2012 | |
| JP | 2014-231861 | A | 12/2014 | |
| JP | 2016-516969 | A | 6/2016 | |
| JP | 2018-159464 | A | 10/2018 | |
| WO | WO-2016152555 | A1 * | 9/2016 | F16C 33/586 |
| WO | 2018/084219 | A1 | 5/2018 | |

OTHER PUBLICATIONS

Written Opinion for corresponding International Application No. PCT/JP2021/045112 dated Mar. 1, 2022.
Notice of Reasons for Refusal for corresponding Japanese Application No. 2022-538859 dated Sep. 6, 2022 and English translation.
English translation of Written Opinion for corresponding International Application No. PCT/JP2021/045112 dated Mar. 1, 2022.
Extended European Search Report dated Oct. 20, 2025 for corresponding European Application No. 21967176.5.

* cited by examiner

ROLLING BEARING

CROSS REFERENCE TO RELATED APPLICATIONS

This application is a continuation application of International Application No. PCT/JP2021/045112, filed on Dec. 8, 2021, the entire contents of which are hereby incorporated by reference.

TECHNICAL FIELD

The disclosure relates to a rolling bearing.

BACKGROUND

A motor is required to have a long life. Thus, it is known to increase the amount of grease in a rolling bearing provided with rolling elements.

SUMMARY

However, when the amount of grease increases and the grease is likely to be entrapped in the rolling elements, it causes the torque of the motor to increase.

In one aspect, an object is to provide a rolling bearing capable of suppressing the entrapment of grease.

In one aspect, a rolling bearing includes an outer ring and an inner ring, a rolling element disposed in a rollable manner between the outer ring and the inner ring, a cage holding the rolling element, and a shield. The outer ring includes a raceway surface supporting the rolling element in a rollable manner, recess parts formed at both direction sides in an axial direction with respect to the raceway surface, and a ridge part formed between the recess part and the raceway surface. The recess part includes a placement surface for placing grease, and a first inclined part formed between the placement surface and the ridge part and approaching an outer peripheral surface of the outer ring toward an outer side in the axial direction.

According to one aspect, the entrapment of grease can be suppressed.

DESCRIPTION OF EMBODIMENTS

Figure 1:
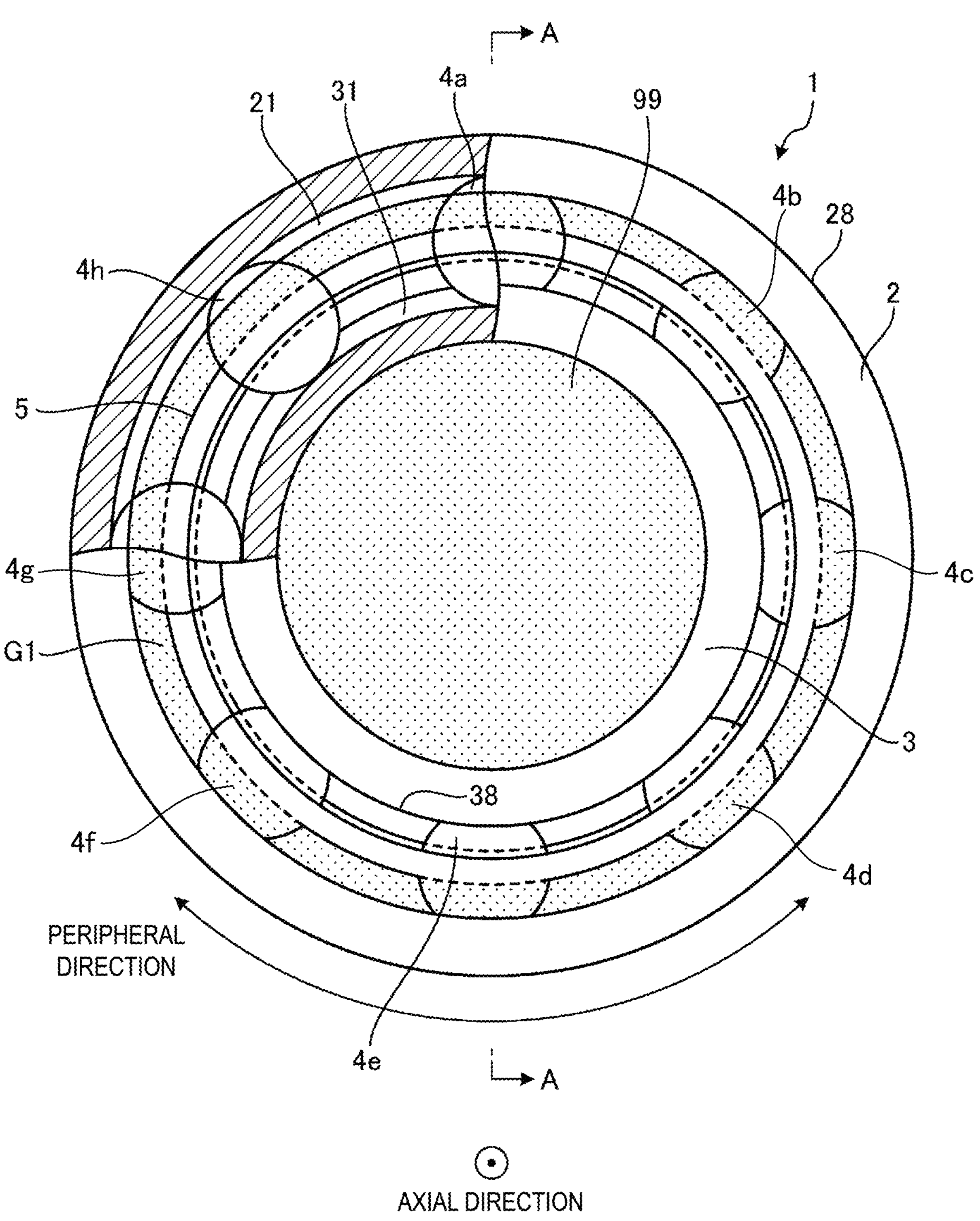
FIG. 1 is a partially cutaway plan view at the other side in an axial direction of a rolling bearing in an embodiment.

Hereinafter, an embodiment of a rolling bearing disclosed in the present application will be described in detail based on the drawings. Note that dimensional relationships between elements and scales of elements in the drawings may differ from actual configurations. The drawings may include parts having mutually different dimensional relationships and scales. For the sake of clarity of description, a coordinate system with an extension direction (or a direction parallel to a rotation axis L) of a below-described shaft 99 defined as an axial direction and a direction orthogonal to the shaft 99 (or the rotation axis L) defined as a radial direction may be illustrated in the drawings.

EMBODIMENTS

Figure 2:
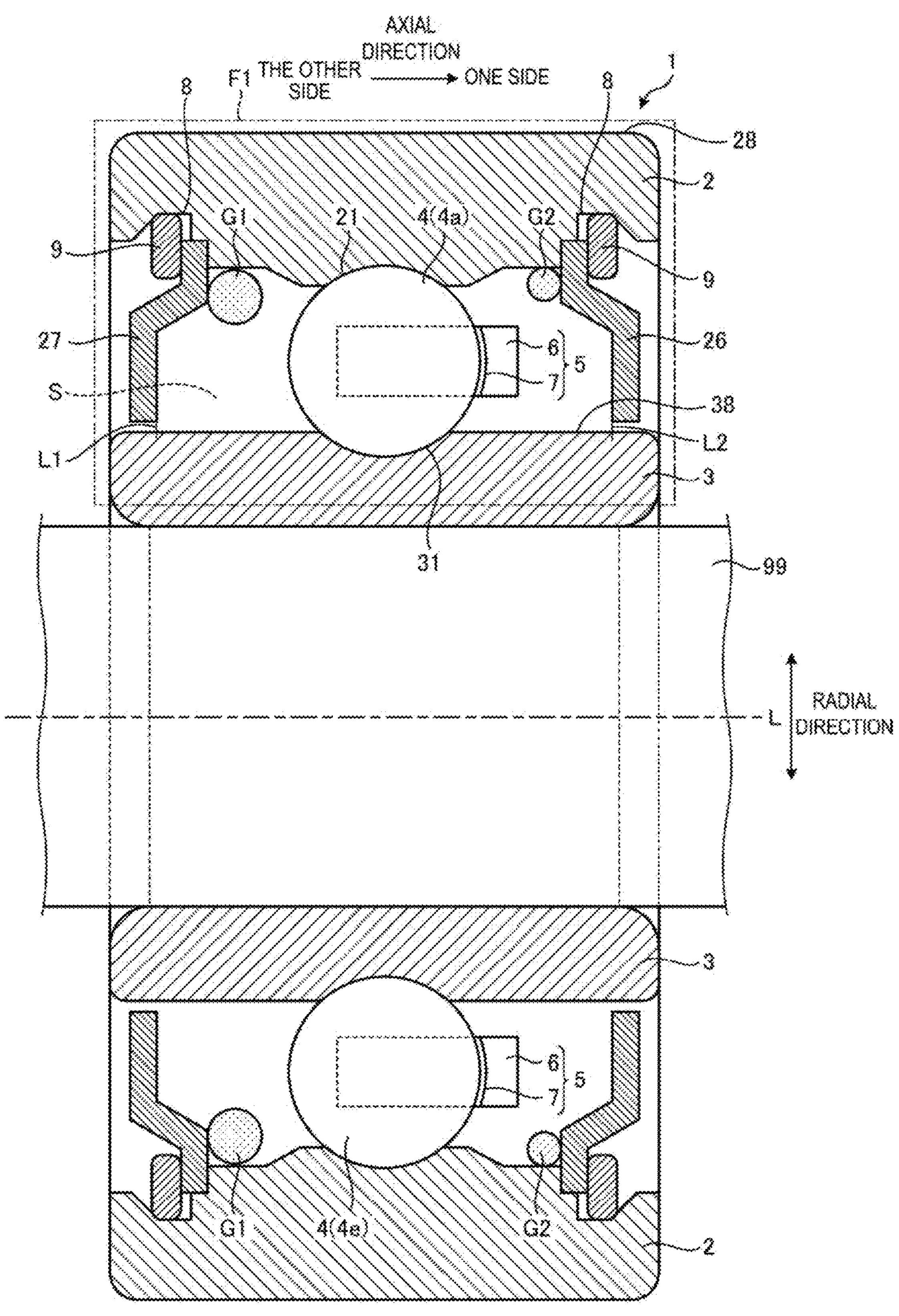
FIG. 2 is a side cross-sectional view illustrating an example of a rolling bearing in an embodiment.
Figure 3:
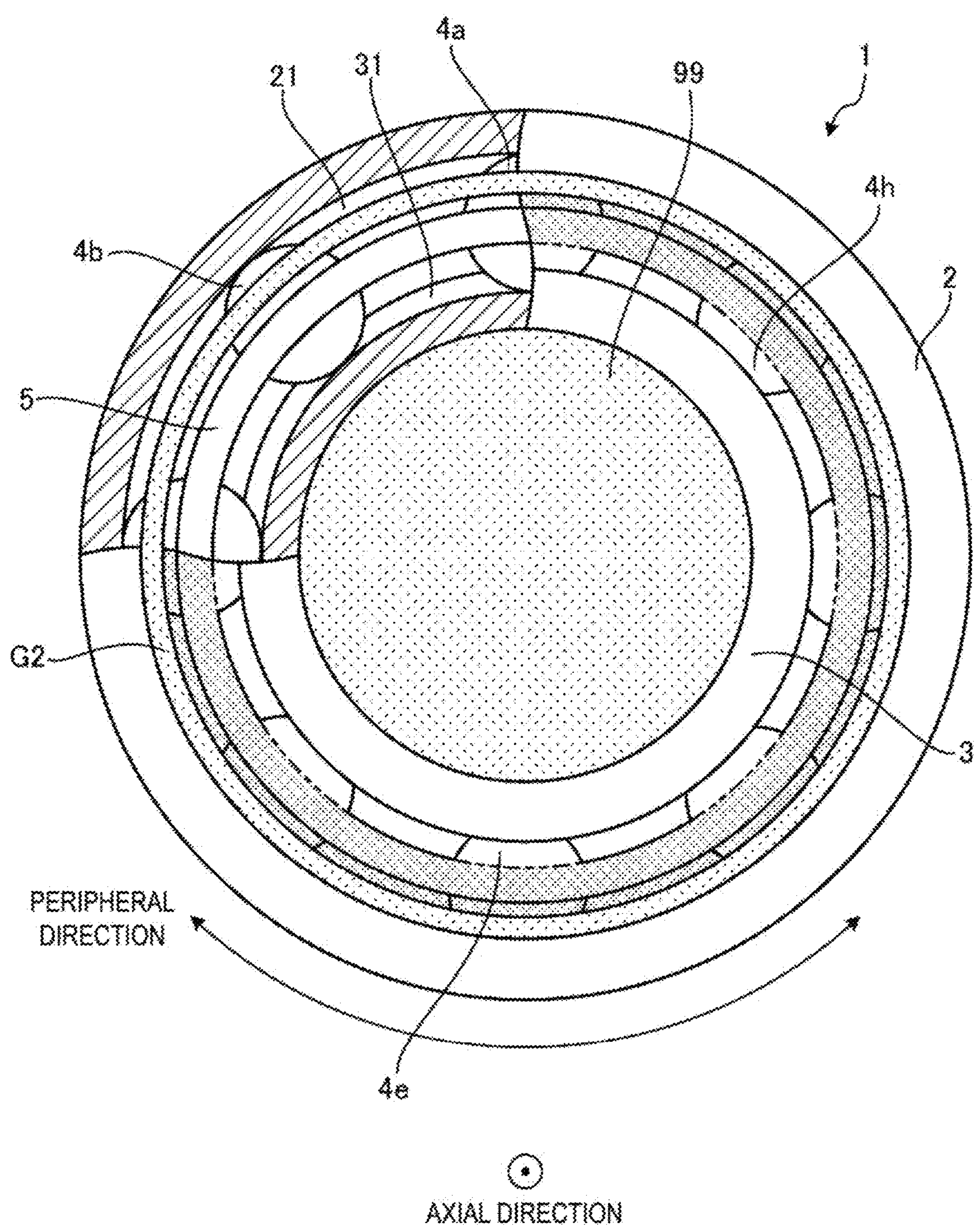
FIG. 3 is a partially cutaway plan view at one side in an axial direction of a rolling bearing in an embodiment.

First, a rolling bearing in the present embodiment will be described using FIGS. 1 to 3. FIG. 1 is a partially cutaway plan view at the other side in the axial direction of the rolling bearing in the embodiment. FIG. 2 is a side cross-sectional view illustrating an example of the rolling bearing in the embodiment. FIG. 3 is a partially cutaway plan view at one side in the axial direction of the rolling bearing in the embodiment. FIG. 2 illustrates a cross section taken along line A-A in FIG. 1.

Figure 4:
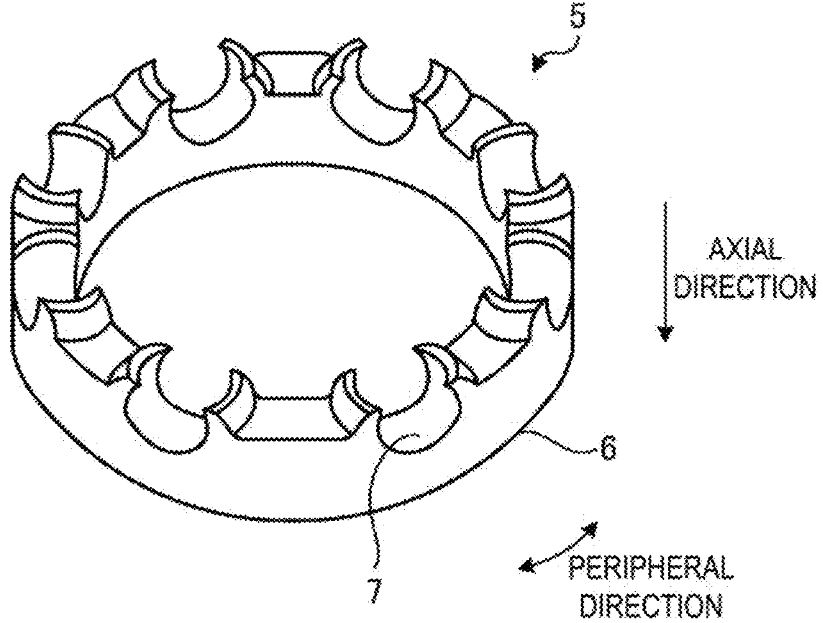
FIG. 4 is a perspective view illustrating an example of a crown-shaped cage in an embodiment.

A rolling bearing 1 in the embodiment includes a cage 5 as a crown-shaped cage, for example, as illustrated in FIG. 4. FIG. 4 is a perspective view illustrating an example of the crown-shaped cage in the embodiment. As illustrated in FIG. 4, the cage 5 in the embodiment includes a base part 6 and pockets 7. Note that, hereinafter, the base part 6 side of the cage 5 of the rolling bearing 1 may be referred to as one side in the axial direction, and the pocket 7 side may be referred to as the other side in the axial direction.

As illustrated in FIGS. 1 to 3, the rolling bearing 1 includes, in addition to the cage 5 illustrated in FIG. 4, an outer ring 2, an inner ring 3 disposed at an inner peripheral side of the outer ring 2, and a plurality of rolling elements 4*a* to 4*h*, and greases G1 and G2 are disposed. The outer ring 2 includes an outer peripheral surface 28 located at an outer side in the radial direction. For example, the rolling bearing 1 rotatably pivotably supports the shaft 99 at an inner peripheral side of the inner ring 3. The shaft 99 extends along the rotation axis L.

Specifically, the outer ring 2 is made of a metal material, such as a steel material. A raceway groove 21 is formed at the outer ring 2 so as to extend in a circumferential direction and opposes the inner ring 3. The surface of the raceway groove 21 constitutes a raceway surface. Further, the inner ring 3 is made of a metal material, such as a steel material. A raceway groove 31 is formed at an outer peripheral surface 38 of the inner ring 3 so as to extend in the circumferential direction. The surface of the raceway groove 31 constitutes a raceway surface.

Figure 5:
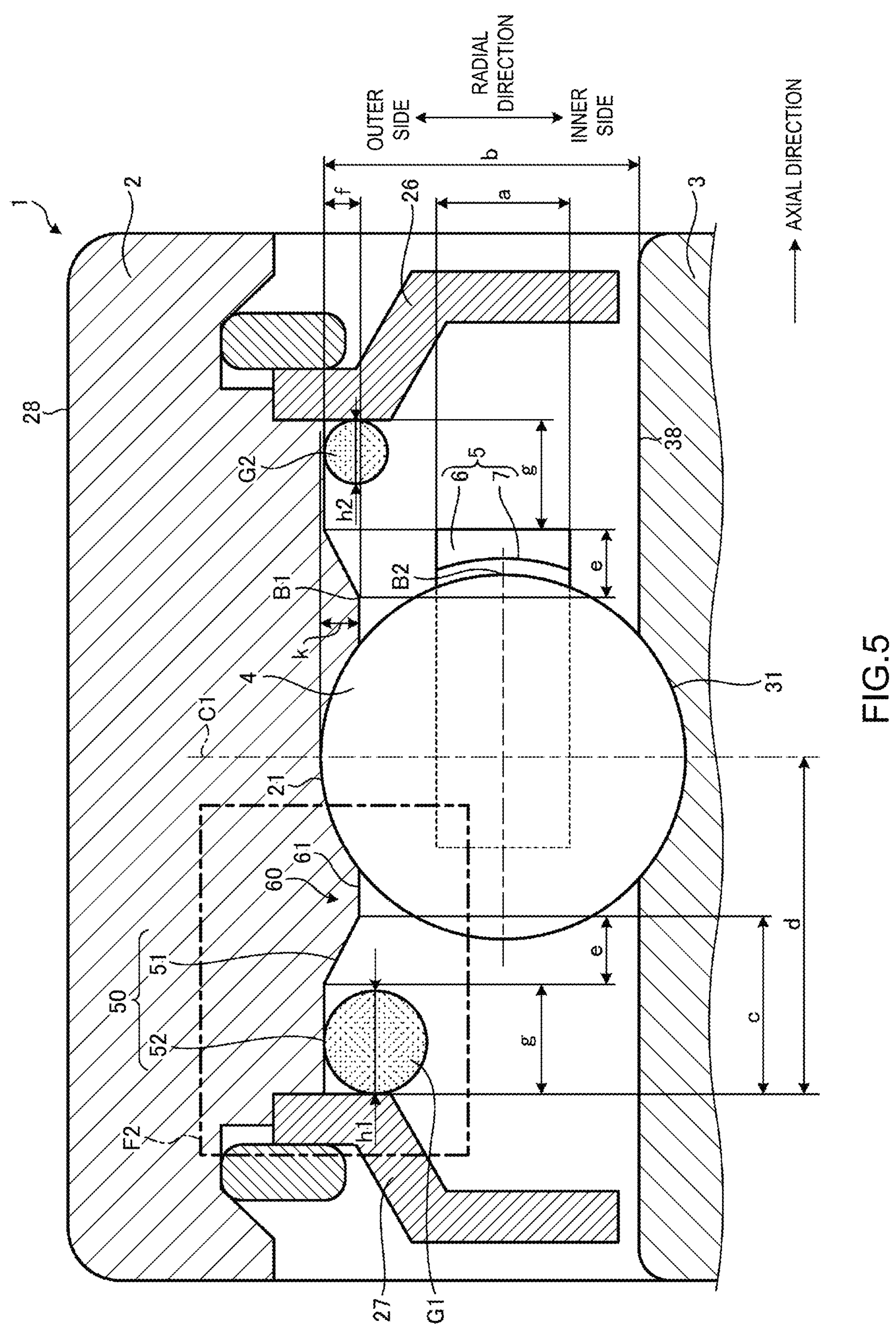
FIG. 5 is a side cross-sectional view illustrating an example of a bearing space in an embodiment.

The outer ring 2 is formed with a recess part 50 and a ridge part 60 illustrated in FIG. 5 at each of the one side and the other side in the axial direction so as to oppose the inner ring 3. FIG. 5 is a side cross-sectional view illustrating an example of a bearing space in the embodiment. FIG. 5 is an enlarged view of a portion illustrated in a frame F1 in FIG. 2. The grease G2 is placed at the recess part 50 at the one side in the axial direction, and the grease G1 is placed at the recess part 50 at the other side in the axial direction. In addition, the ridge part 60 is formed between the recess part 50 and the raceway groove 21 in the axial direction. Note that, in FIG. 5 and subsequent figures, illustration of the pockets 7 of the cage 5 may be omitted.

As illustrated in FIG. 2, the plurality of rolling elements 4*a* to 4*h* are provided between the raceway groove 21 of the outer ring 2 and the raceway groove 31 of the inner ring 3.

Note that, hereinafter, when the rolling elements 4*a* to 4*h* are represented without distinction, the rolling elements 4*a* to 4*h* may be simply referred to as rolling elements 4. The rolling element 4 is made of, for example, a metal material, such as a steel material, or a ceramic material. The raceway groove 21 and the raceway groove 31 constitute raceways, and the rolling elements 4 roll on the raceways while coming into contact with the raceway surfaces of the raceway grooves 21 and 31.

The cage 5 is a crown-shaped cage made of synthetic resin or metal, and the plurality of rolling elements 4 are disposed at equal intervals in the raceways. In addition, the cage 5 has a plurality of opening parts (pockets) 7 for accommodating the plurality of rolling elements 4 at the other side in the axial direction, and includes the base part 6 having an annular shape as a non-opening side of the cage 5 at the one side in the axial direction.

The rolling elements 4 are accommodated in the pockets 7 of the cage 5 illustrated in FIG. 4. In this case, the one side in the axial direction of the rolling element 4 is supported by the base part 6.

In addition, the rolling bearing 1 further includes one shield 26 closing a space between the outer ring 2 and the inner ring 3 at one end side in the axial direction and the other shield 27 closing a space between the outer ring 2 and the inner ring 3 at the other end side in the axial direction. The one and other shields 26 and 27 are plate members having a substantially annular shape and made of a galvanized steel sheet, a stainless steel sheet, an elastic material reinforced by a core metal, or the like. Respective outer peripheral parts of the one and other shields 26 and 27 are attached to the outer ring 2. Specifically, attachment grooves 8 are formed at each end part of the outer ring 2 in the axial direction. The attachment groove 8 is open in a direction opposed to the inner ring 3. The outer peripheral parts of the one and other shields 26 and 27 are accommodated in the respective attachment grooves 8 and are fixed by, for example, retaining rings 9. On the other hand, inner peripheral parts of the one and other shields 26 and 27 extend to the vicinity of the inner ring 3. Thus, the one and other shields 26 and 27 cover the spaces between the outer ring 2 and the inner ring 3 to protect the rolling elements 4 and the greases G1 and G2. Note that, in the rolling bearing 1, the one and other shields 26 and 27 are spaced apart from the inner ring 3.

In the embodiment, as illustrated in FIG. 2, the greases G1 and G2 are disposed at the recess parts 50 formed at the outer ring 2. The greases G1 and G2 are disposed at a bearing space S obtained by subtracting the volumes of the plurality of rolling elements 4 and the cage 5 from the volume of a region surrounded by the outer ring 2 and the inner ring 3, the shields 26 and 27, and virtual lines L1 and L2 extending from an inner side in the radial direction of the shields 26 and 27 to the outer peripheral surface 38.

The grease G2 is sealed in the bearing space S at the one side in the axial direction across the plurality of rolling elements 4, and the grease G1 is sealed in the bearing space S at the other side in the axial direction across the plurality of rolling elements 4, respectively. The grease G1 is disposed in contact with a placement surface 52 of the recess part 50 and the shield 27. Similarly, the grease G2 is disposed in contact with the placement surface 52 of the recess part 50 and the shield 26.

In the embodiment, as illustrated in FIGS. 1 to 3, the volume of the grease G1 is larger than the volume of the grease G2. In this case, as illustrated in FIG. 2, in a stationary state, a cross-sectional area h1 of the grease G1 is larger than a cross-sectional area h2 of the grease G2. In the embodiment, the application volumetric ratio between the grease G1 and the grease G2 is, for example, 9:1 to 5:5. Thus, contact between the grease G2 and the cage 5 can be suppressed.

For example, as illustrated in FIG. 1, the grease G1 is applied in a ring shape along the circumferential direction of the rolling bearing 1, but the grease formed in a spherical shape may be disposed along the circumferential direction. Further, the volumes of the greases G1 and G2 accounts for, for example, 5 to 60%, preferably 25 to 35% of the volume of the bearing space S.

The ridge part 60 protrudes radially inward from the raceway groove 21 to suppress the rolling elements 4 from mounting on a shoulder of the raceway groove 21. The ridge part 60 includes, for example, a flat part 61 formed substantially parallel to the outer peripheral surface 28 of the outer ring 2. Note that, as illustrated in FIG. 5, the ridge part 60 may not include a portion other than the flat part 61. Further, the cross section of the ridge part 60 may have a non-flat shape, for example, an arc shape.

As illustrated in FIG. 5, the recess part 50 includes a first inclined surface 51 and the placement surface 52. The first inclined surface 51 is formed continuously with the placement surface 52 and the ridge part 60 in the axial direction. The first inclined surface 51 in the embodiment is a surface (conical surface) inclined such that the distance from the outer peripheral surface 28 of the outer ring 2 decreases toward the placement surface 52 from the ridge part 60. Note that the first inclined surface 51 is an example of a first inclined part.

A depth f in the radial direction of the recess part 50 is, for example, equal to or less than a depth k of the raceway groove 21 in the radial direction. In the embodiment, the depth f is substantially equal to the depth k of the raceway groove 21 in the radial direction.

The placement surface 52 is, for example, a flat surface formed substantially parallel to the outer peripheral surface 28 of the outer ring 2. In the embodiment, the placement surface 52 is formed continuously with the first inclined surface 51 in the axial direction, and is in contact with the shield 26 or 27 in the axial direction. In the stationary state, the greases G1 and G2 are each placed at the placement surface 52 of the recess part 50. In this case, a base oil component contained in the greases G1 and G2 move to the raceway groove 21 along the placement surface 52 and the first inclined surface 51 of the recess part 50.

Figure 6:
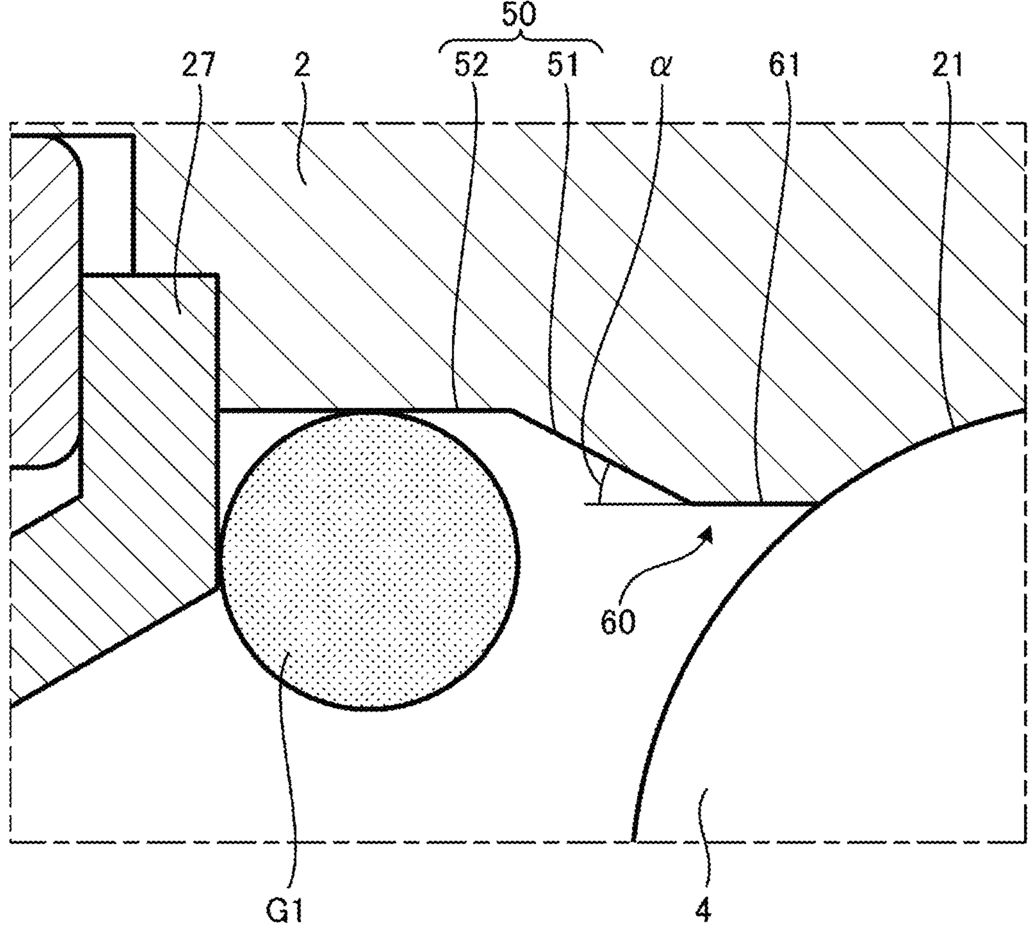
FIG. 6 is an enlarged side cross-sectional view of a bearing space in an embodiment.

In this case, in order to smoothly move the base oil component contributing to the lubrication of the rolling elements 4 to the raceway groove 21 over the ridge part 60 having a height in the radial direction, the inclination of the first inclined surface 51 is desirably gradual. In the embodiment, as illustrated in FIG. 6, an angle $\alpha$ of the first inclined surface 51 with respect to the flat part 61 is, for example, about 30°. FIG. 6 is an enlarged side cross-sectional view of the bearing space in the embodiment. FIG. 6 is an enlarged view of a portion illustrated in a frame F2 in FIG. 5.

On the other hand, when the greases G1 and G2 are entrapped in the raceway groove 21, the torque increases due to stirring resistance, causing an increase in power consumption of the motor. Further, in order to suppress the entrapment of the greases G1 and G2 and to stably place the greases G1 and G2 at the placement surface 52, it is preferable to ensure a sufficient size of the placement surface 52. In the embodiment, a length c of the recess part 50 in the axial direction is desirably 40% or more of a size d of a gap in the axial direction between the central part CI in the axial direction of the outer ring 2 and an end part at an outer side in the axial direction of the recess part 50. Further, a length g of the placement surface 52 in the axial direction is preferably 50% or more of the length c of the recess part 50. Note that, in the embodiment, the length c of the recess part 50 in the axial direction is the sum of a length e of the first inclined surface 51 in the axial direction and the length g of the placement surface 52 in the axial direction.

Further, in order to make the angle α sufficiently gradual, the length e of the first inclined surface 51 in the length c of the recess part 50 is desirably 30% or more. However, since the length g of the placement surface 52 needs to be ensured, the length e of the first inclined surface 51, the length e of the first inclined surface 51 in the length c of the recess part 50 is preferably less than 50%.

Further, the ratio between the depth f and the length c of the recess part 50 in the axial direction is preferably, for example, from 1:4 to 1:6. In this case, as illustrated in FIG. 5, the depth f of the recess part 50 in the radial direction with respect to the ridge part 60 is, for example, substantially equal to the depth k of the raceway groove 21 of the outer ring 2 in the radial direction with respect to the ridge part 60.

Note that, in order to suppress the cage 5 from coming into contact with the grease G2 due to vibration of the motor or the like, a length a of the cage 5 in the radial direction is preferably small. In the embodiment, as illustrated in FIG. 5, the length a of the cage 5 in the radial direction is, for example, 50% or less of a length b from the placement surface 52 of the outer ring 2 to the outer peripheral surface 38 of the inner ring 3 in the radial direction.

Further, at the non-opening side of the cage 5, a portion for the base part 6 and the recess part 50 of the outer ring 2 to overlap each other in the axial direction, in other words, a portion for the base part 6 and the recess part 50 opposing in the radial direction can be increased. Thus, the grease G2 is suppressed from coming into contact with the cage 5, and lubricant oil can be easily supplied to the raceway groove 21. In the embodiment, as illustrated in FIG. 5, almost the entirety of the base part 6 of the cage 5 opposes the recess part 50 in the radial direction.

In addition, in the embodiment, the recess part 50 at the one side in the axial direction and the recess part 50 at the other side in the axial direction are formed so as to be substantially symmetrical with respect to the central part CI in the axial direction. In other words, the length c in the axial direction and the depth f in the radial direction of the recess part 50, the length e of the first inclined surface 51 in the axial direction, and the length g of the placement surface 52 in the axial direction are all substantially the same at the one side in the axial direction and the other side in the axial direction. In this case, the ratios of the volumes of the greases G1 and G2 with respect to the bearing space S are also different at the one side in the axial direction than at the other side in the axial direction.

As described above, the rolling bearing 1 in the present embodiment includes the outer ring 2 and the inner ring 3, the rolling elements 4 disposed in a rollable manner between the outer ring 2 and the inner ring 3, the cage 5 holding the rolling elements 4, and the shields 26 and 27. The outer ring 2 includes a raceway surface 21 supporting the rolling elements 4 in a rollable manner, the recess parts 50 formed at both direction sides in the axial direction with respect to the raceway surface 21, and the ridge part 60 formed between the recess part 50 and the raceway surface 21. The recess part 50 includes the placement surface 52 to be placed with the greases G1 and G2, and a first inclined part 51 formed between the placement surface 52 and the raceway surface 21 and approaching the outer peripheral surface 28 of the outer ring 2 toward the outer side in the axial direction. With such a configuration, the base oil component can easily move from the greases G1 and G2 to the raceway surface 21. Accordingly, an increase in the torque of the rolling bearing 1 can be suppressed, and power saving of the motor can be achieved.

MODIFICATIONS

Although the configurations of the present embodiment have been described above, the embodiment is not limited to such configurations. For example, the recess part 50 may be formed at only one side in the axial direction, in other words, at the base part 6 side of the cage 5, rather than at both sides in the axial direction. Even in such a configuration, the grease G2 can be suppressed from being entrapped in the raceway groove 21.

Figure 7:
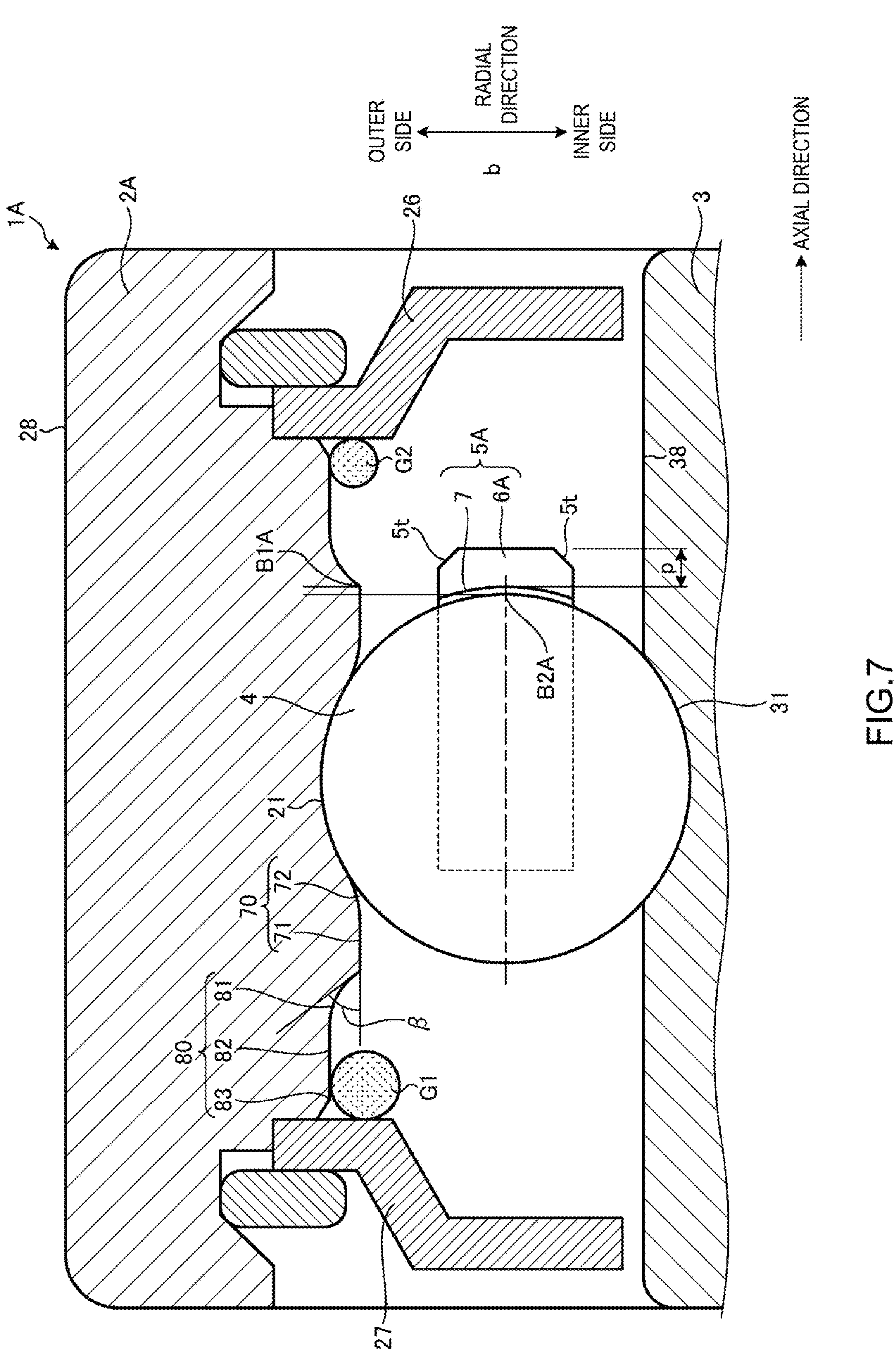
FIG. 7 is a side cross-sectional view illustrating an example of a bearing space in a first modification.

In addition, as illustrated in FIG. 7, the inclined part of the recess part formed at the outer ring may be formed to be rounded. Further, as illustrated in FIG. 7, chamfers may be formed at the one side in the axial direction of the cage. FIG. 7 is a side cross-sectional view illustrating an example of a bearing space in a first modification. As illustrated in FIG. 7, a recess part 80 formed at an outer ring 2A of a rolling bearing 1A in the first modification includes a first curved surface part 81 and further includes a second inclined surface 83. Further, in addition to a flat part 71, a ridge part 70 in the first modification includes a second curved surface part 72 having a distance in the radial direction from the outer peripheral surface 28 of the outer ring 2A decreasing toward the raceway groove 21. Note that the first curved surface part 81 is another example of the first inclined part.

In the first curved surface part 81, the depth of the recess part 80 with respect to the ridge part 70 in the radial direction changes nonlinearly unlike the embodiment. Further, the second inclined surface 83 approaches the outer peripheral surface 28 of the outer ring 2 toward the outer side in the axial direction. Also in the first modification, a portion having the depth of the recess part 80 in the radial direction decreasing toward the outer side in the axial direction is not formed at the recess part 80. In other words, also in the first modification, the depth of the recess part 80 in the radial direction changes only in one direction. Note that the second inclined surface 83 is an example of a second inclined part.

As illustrated in FIG. 7, when the first curved surface part 81 is formed at the recess part 80, the base oil component of the greases G1 and G2 can easily move by the raceway groove 21, and processability of the recess part 80 can be improved.

In the first modification, the second curved surface part 72 is formed continuously with the raceway groove 21 of the outer ring 2, for example. Note that, instead of the second curved surface part 72 in the first modification, an inclined surface having a distance from the outer peripheral surface 28 decreasing toward the raceway groove 21 may be provided. In this case, the distance in the radial direction between the inclined surface and the outer peripheral surface 28 changes linearly.

In addition, the recess part 80 includes the second inclined surface 83 at a position in contact with the shields 26 and 27. The second inclined surface 83 is formed such that a distance in the radial direction from the outer peripheral surface 28 decreases toward the outer side in the axial direction. Also in the first modification, a portion with the distance from the outer peripheral surface 28 increasing toward the outer side in the axial direction is not formed at the recess part 80. Note that, in the first modification, the length of the recess part 80 in the axial direction is the sum of the length of the first curved surface part 81 in the axial direction, the length of a placement surface 82 in the axial direction, and also the length of the second inclined surface 83 in the axial direction. In addition, instead of the second inclined surface 83 being substantially parallel with respect to the axial direction, a curved surface part being curved with respect to the axial direction may be provided.

Further, in the embodiment, as illustrated in FIG. 5, a boundary B1 between the ridge part 60 and the first inclined surface 51 is located at an inner side in the axial direction with respect to an outer edge B2 of the rolling element 4 in the axial direction, but the embodiment is not limited to the above. For example, as illustrated in FIG. 7, a boundary BIA may be located at the outer side in the axial direction with respect to the outer edge B2A, or the positions in the axial direction of the boundary BIA and an outer edge B2A may be substantially the same. Note that, in any positional relationship, ¾ or more of a length p of the base part 6 of the cage 5 in the axial direction is desirably located at a position opposing the recess part 80 in the radial direction.

Figure 9:
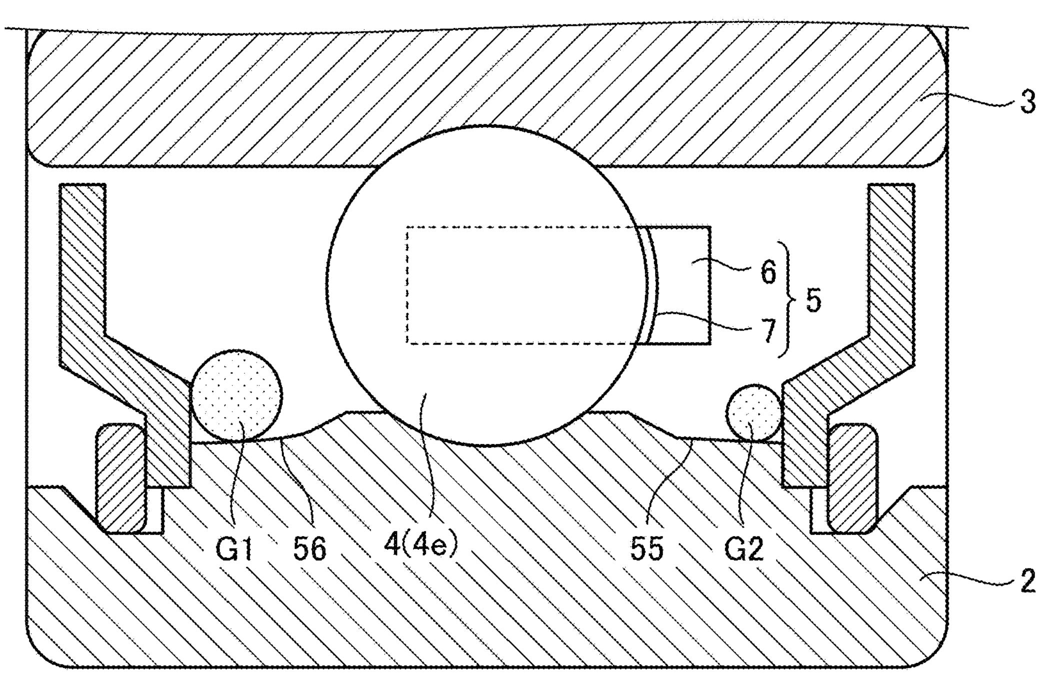
FIG. 9 is a side cross-sectional view illustrating an example of a bearing space in an embodiment.

Further, the placement surfaces 52 and 82 are not limited to flat surfaces substantially parallel to the outer peripheral surface 28, such as an inclined placement surface 55 as illustrated in FIG. 9, and may be surfaces inclined in the axial direction, or may be curved surfaces formed to be rounded with respect to the axial direction, such as a curved placement surface 56 as illustrated in FIG. 9. Also in this case, the depth in the radial direction of the placement surface 52, 55, 56, or 82 desirably changes only in one direction of the recess part 80.

Further, in the embodiment, an angle α formed by the first inclined surface 51 and the flat part 61 is, for example, 10° to 80°, and preferably 30° to 60°. In the first modification, a maximum angle β formed by a tangent line of the first curved surface part 81 and the flat part 61 is, for example, 10° to 80°, and preferably 30° to 60°.

Note that, as illustrated in FIG. 7, in a crown-shaped cage 5A in the first modification, chamfers 5*t* are formed at a base part 6A. In the first modification, the chamfer 5*t* is formed, for example, so as to have an angle of 45° with respect to the radial direction. By forming the chamfers 5*t*, the distance between the grease G2 located at the one side in the axial direction and the crown-shaped cage 5A can be increased.

Figure 8:
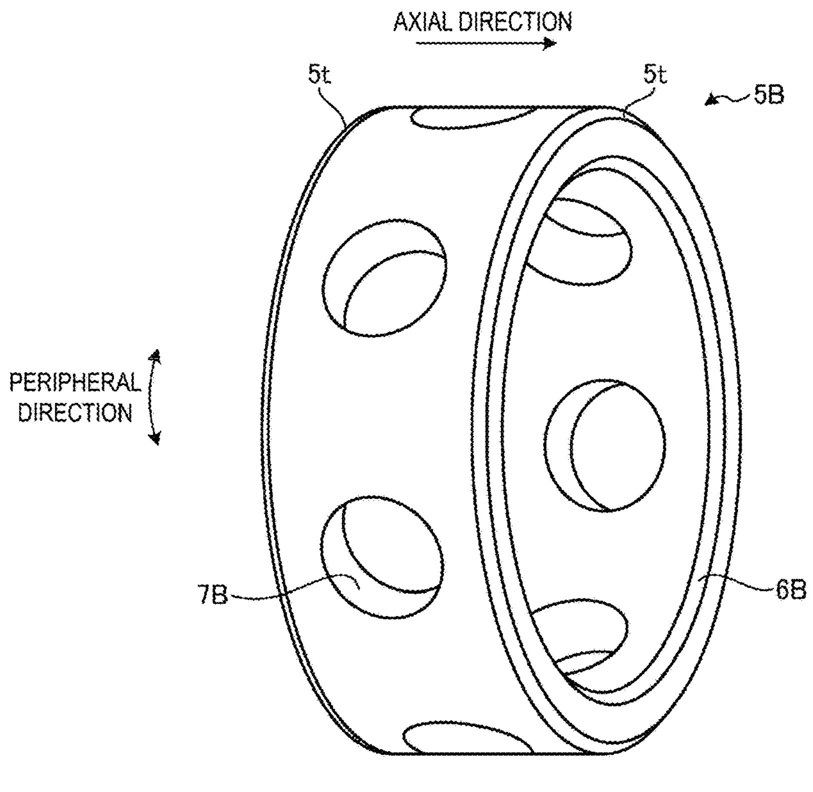
FIG. 8 is a perspective view illustrating an example of a machined cage in a second modification.

Further, the cage in the embodiment is not limited to a crown-shaped cage, and may be a machined cage as illustrated in FIG. 8, for example. FIG. 8 is a perspective view illustrating an example of a machined cage in a second modification. As illustrated in FIG. 8, a machined cage 5B in the second modification includes a base part 6B and pockets 7B for accommodating the rolling elements 4. In addition, similarly to the crown-shaped cage 5A in the first modification, the chamfer 5*t* may also be formed at the machined cage 5B in the second modification.

As illustrated in FIG. 8, the machined cage 5B is formed, for example, symmetrically with respect to the axial direction. In this case, the volumetric ratio between the greases G1 and G2 may be, for example, 5:5. In the case, as illustrated in FIG. 8, the chamfer 5*t* may be formed not only at the one side in the axial direction but also at the other side in the axial direction. Thus, not only the distance between the grease G2 located at the one side in the axial direction and the machined cage 5B, but also the distance between the grease G1 located at the other side in the axial direction and the machined cage 5B can be increased.

Further, the number of the plurality of rolling elements 4 included in the rolling bearing 1 is an example, and may be seven or less or nine or more. Alternatively, the shields 26 and 27 may be fixed without using the retaining ring 9.

The embodiment and respective modifications of the disclosure have been described above. However, the disclosure is not limited to the embodiment and the respective modifications and can be variously modified without departing from the gist of the disclosure. Various modifications within a scope not departing from the gist are also included in the technical scope of the disclosure, and this is obvious to a person having skill in the art from the description of the claims.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A rolling bearing, comprising:
an outer ring and an inner ring;
a rolling element disposed in a rollable manner between the outer ring and the inner ring;
a cage holding the rolling element; and
a shield, wherein
the outer ring includes:
a raceway surface supporting the rolling element in a rollable manner;
a first recess part formed at a first direction side in an axial direction of the rolling bearing with respect to the raceway surface; and
a first ridge part formed between the first recess part and the raceway surface, and
the first recess part includes a placement surface for placing grease and a first inclined part formed between the placement surface and the first ridge part and approaching an outer peripheral surface of the outer ring toward an outer side in the axial direction of the rolling bearing, and
a second inclined part is formed between the placement surface and the shield, and in the second inclined part, a distance from the outer peripheral surface of the outer ring decreases toward the outer side in the axial direction.

2. The rolling bearing according to claim 1, wherein
the placement surface includes a flat surface formed substantially parallel to the outer peripheral surface of the outer ring,
the first ridge part includes a flat part formed substantially parallel to the outer peripheral surface of the outer ring, and
the flat part is formed continuously with the first inclined part in the axial direction.

3. The rolling bearing according to claim 1, wherein
an end part at a side opposite from the first inclined part of the placement surface is in contact with the shield.

4. The rolling bearing according to claim 1, wherein
the placement surface and the first inclined part are not formed with a portion having a distance from the outer peripheral surface of the outer ring increasing toward the outer side in the axial direction.

5. The rolling bearing according to claim 1, wherein
the cage holds the rolling element from one side in the axial direction with respect to the raceway surface, and an amount of the grease placed at another side in the axial direction is larger than an amount of the grease placed at the one side in the axial direction.

6. The rolling bearing according to claim 5, wherein a ratio between a volume of the grease placed at the one side in the axial direction and a volume of the grease placed at the other side in the axial direction is 1:9 or more and less than 5:5.

7. The rolling bearing according to claim 1, wherein a size and shape of the first recess part formed at the first direction side in the axial direction with respect to the raceway surface is substantially the same as a size and shape of a second recess part formed at a second direction side in the axial direction with respect to the raceway surface.

8. The rolling bearing according to claim 1, wherein a ratio of a volume of the grease to a bearing space is 5% to 60%, the bearing space being obtained by subtracting a volume of the rolling element and a volume of the cage from a volume of a region surrounded by the outer ring and the inner ring, the shield, and virtual lines extending from an inner side in a radial direction of the shield to the outer peripheral surface of the inner ring.

9. The rolling bearing according to claim 1, wherein in the axial direction of the rolling bearing, a proportion of the placement surface relative to the total axial length of the first recess part is 50% or more, and a proportion of the first inclined part relative to the total axial length of the first recess part is 30% or more.

10. The rolling bearing according to claim 1, wherein a maximum angle of the first inclined part with respect to the axial direction of the rolling bearing is from 10 degrees to 80 degrees.

11. The rolling bearing according to claim 1, wherein a maximum angle of the first inclined part with respect to the axial direction of the rolling bearing is from 30 degrees to 60 degrees.

12. The rolling bearing according to claim 1, wherein in a radial direction of the rolling bearing, a proportion of a length of the cage to a distance between the placement surface and an outer peripheral surface of the inner ring is 50% or less.

13. The rolling bearing according to claim 1, wherein a proportion of a length of the first recess part in the axial direction of the rolling bearing to a length of a gap in the axial direction of the rolling bearing between a central part in the axial direction of the outer ring and an end part at the outer side in the axial direction of the first recess part is 40% or more.

14. The rolling bearing according to claim 1, wherein a ratio between a depth of the recess part in a radial direction of the rolling bearing and a length in the axial direction of the first recess part with respect to the first ridge part is from 1:4 to 1:6.

15. The rolling bearing according to claim 1, wherein a depth in a radial direction of the first recess part is equal to or less than a depth of the raceway surface in a radial direction of the rolling bearing.

16. The rolling bearing according to claim 1, wherein the placement surface includes a surface inclined with respect to the outer peripheral surface of the outer ring.

17. The rolling bearing according to claim 1, wherein the placement surface includes a curved surface.

* * * * *